June 25, 1963

T. G. LANG 3,094,960

HYDROFOIL FOR WATER CRAFT

Filed Nov. 19, 1959

THOMAS G. LANG,
INVENTOR.

HERZIG & JESSUP,
Attorneys.

BY Warren F. Jessup

June 25, 1963

T. G. LANG 3,094,960

HYDROFOIL FOR WATER CRAFT

Filed Nov. 19, 1959

THOMAS G. LANG,
INVENTOR.

BY HERZIG & JESSUP,
Attorneys.

Warren F. Jessup

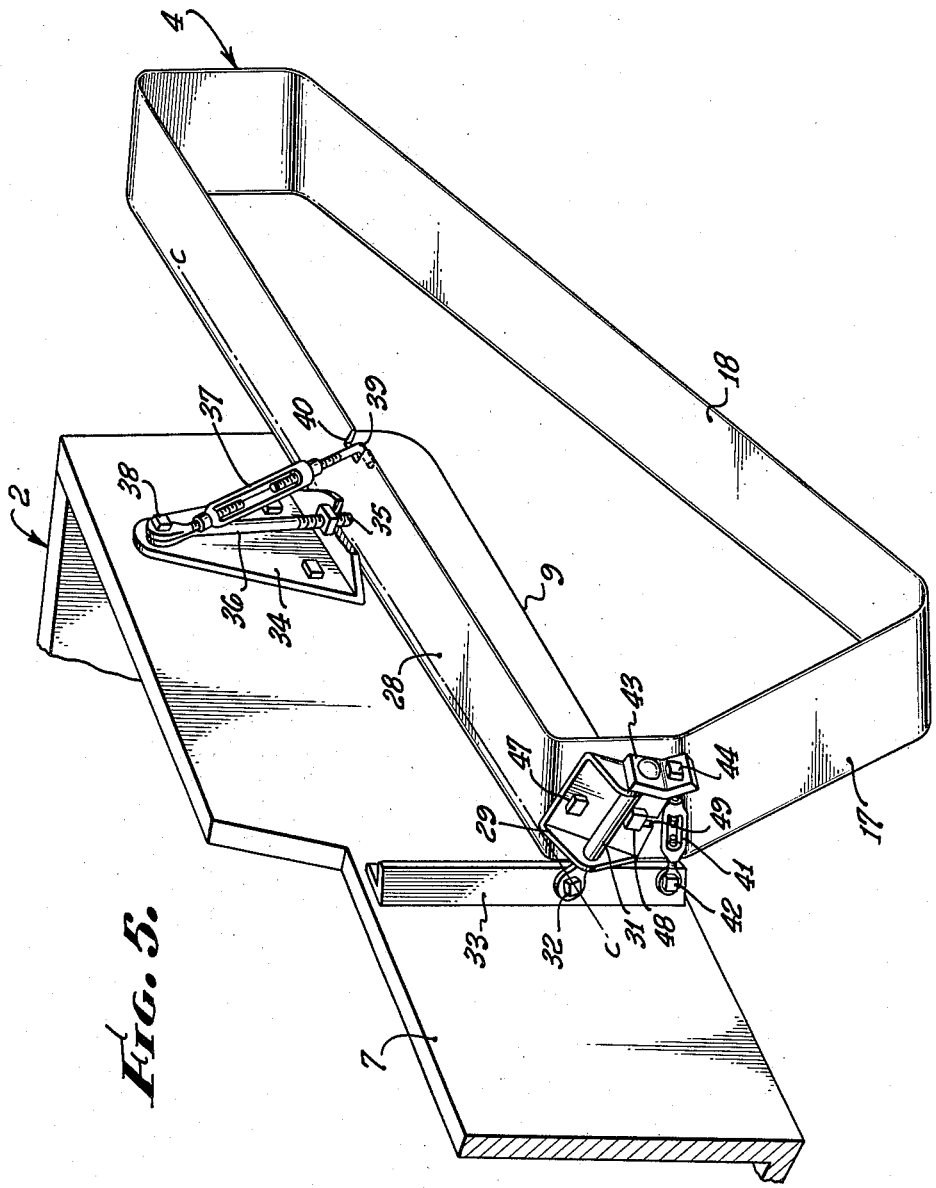

THOMAS G. LANG,
INVENTOR.
HERZIG & JESSUP,
Attorneys.

United States Patent Office 3,094,960
Patented June 25, 1963

3,094,960
HYDROFOIL FOR WATER CRAFT
Thomas G. Lang, Arcadia, Calif.
(1777 Grevelia St., Apt. J, South Pasadena, Calif.)
Filed Nov. 19, 1959, Ser. No. 854,176
6 Claims. (Cl. 114—66.5)

This invention relates to hydrofoils adapted for use on various types of water craft to raise the hull partly or entirely above the water surface.

The advantages of well designed hydrofoil craft over conventional high speed planing craft are well known by those familiar with hydrofoils. The use of hydrofoils permit speed increases of 25% to 100%, or permits operation at the same speed with ½ to ⅓ the power, and with equivalent fuel savings, or permits a load two or three times greater to be carried at the same speed and power, and provides a much smoother ride in rough water. The disadvantages inherent in most hydrofoil systems are complex construction, high cost, lack of adaptability to existing boats and motors, requirement for movement of hydrofoils to obtain adequate turns and banking during turns, complex mechanism for varying the boat trim with speed, complex retraction and angle of attack adjustment mechanisms, and inadequate safety devices when an obstruction is encountered.

An object of this invention is to provide a hydrofoil configuration having good stability in pitch, yaw, roll, and elevation in both calm water and in waves and which banks in turns without necessitating movement of the hydrofoils during operation.

Another object is to provide a set of hydrofoils which can be easily attached by the layman to most conventional outboard boats in order to convert them into hydrofoil craft.

Another object is to provide novel means for retracting the hydrofoils to a position substantially above the water and inside the maximum beam width of the boat to permit easy mooring, beaching, docking, and transporting over land.

Another object is to provide novel means of combining hydrofoil retraction with means for varying the angle of attack of the hydrofoils, said variation being desirable to optimize performance under widely varying loading and speed conditions.

Another object is to provide novel shapes for the front and rear hydrofoils in order to vary, with speed, the trim of the boat, banking angle, turning rate, and ventilation susceptibility.

Another object is to provide safety means for reducing or eliminating damage to the hydrofoils, boat, and passengers, in case an obstruction is struck while operating at high or low speed.

Another object is to provide a simple hydrofoil configuration having a minimum number of parts which can be easily manufactured at low cost.

Other objects and advantages of the invention will be apparent from the following description:

In the accompanying drawings, forming a part of this specification, and in which like numerals are employed to designate like parts throughout the same;

FIGURE 5 is a fragmentary perspective view of the right rear hydrofoil and its mounting to the boat transom.

Figure 1:
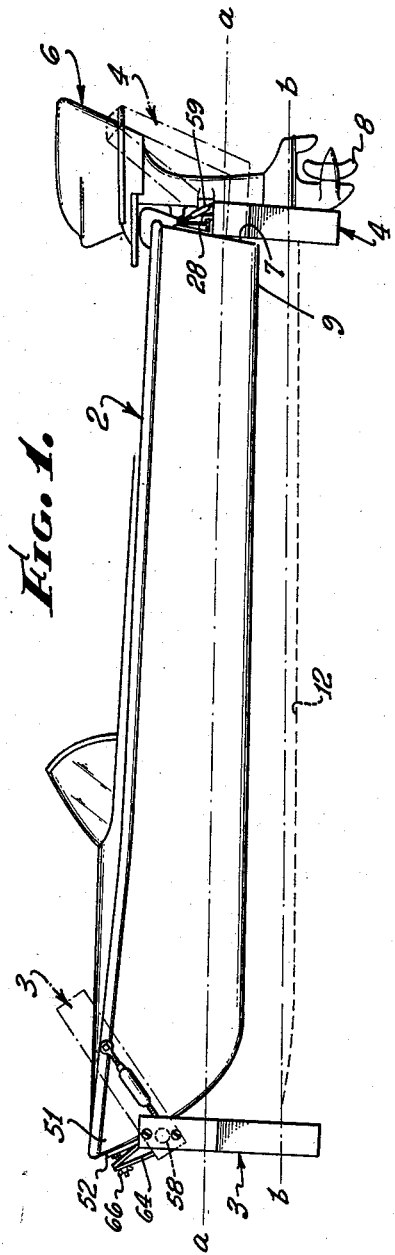
FIGURE 1 is a side elevational view of an outboard boat equipped with the novel hydrofoil configuration described herein.

Referring more particularly to the drawings, the numeral 2 in FIGURE 1 refers to a water craft, or in this case an outboard boat, to which a bow hydrofoil 3 and two stern hydrofoils 4 are attached. An outboard motor 6 is shown attached to the transom 7 of boat 2. When motionless, the water level is at position $a$—$a$. As the boat gains forward speed the hydrofoils develop lift in a well known manner and raise the boat so that at top speed the water level is at position $b$—$b$. At top speed, the outboard motor propeller 8 must either be submerged below water level $b$—$b$ or must be a specially designed propeller that will operate adequately when only partially submerged. Preferably, a conventional fully submerged propeller will be used, in which case it must be lowered several inches below the depth at which it would normally operate relative to the boat if hydrofoils were not used. It has been discovered that an outboard motor having a standard and commercially available 5" or 6" shaft extension can be used to provide this additional required depth.

An alternate method of lowering the propeller is to mount the outboard motor one to two feet behind the boat on a specially designed motor bracket which permits the motor to be mounted several inches lower. The bracket may either be rigid or adjustable. The former are shown, for example, in U.S. Patents 2,916,009 and 2,782,-744. In the latter case, the outboard motor and its propeller could be automatically adjustable as disclosed in my co-pending application, Serial No. 854,103, filed November 19, 1959, entitled, "Mounting Means for Boat Propulsion."

It has been found that the hydrofoil configuration described herein will generally perform adequately at high speed in all wave conditions compatible with safe operation at any speed of the outboard boat without hydrofoils. In this range of wave conditions it has been found in tests that the bottom 9 of the stern of the boat seldom strikes the wave crests even when the stern bottom is only four to six inches above the calm water level $b$—$b$; however, the bottom of the bow must be six to twelve inches above $b$—$b$, because the bow hydrofoil is subjected to much rougher operating conditions than the stern hydrofoils. It is advantageous to keep the stern as near as possible to the water level $b$—$b$ so the propeller will remain submerged at high speed without requiring excessive lowering of the propeller or outboard motor. Also, the lower center of gravity improves the banking characteristics during a turn and improves the general boat stability.

It has also been discovered in tests, that a trough 12 forms in the water behind the bow hydrofoil 3, lowering the water surface in the vicinity of the propeller as much as 2 to 5 inches. Consequently, the propeller must be lowered further than would normally be required if the bow hydrofoil were not directly in front of the propeller. During experiments with various types of V-shaped bow hydrofoils, it was discovered that the trough was shallower when the acute angle C in FIGURE 2 between each arm of the V and the horizontal (herein called dihedral), was increased. It is believed that this is due to the fact that for a given submerged span, the increased dihedral lowers the central portion 13 of the V-hydrofoil 3 relative to the water surface b—b. It is a well known fact that the greater the depth of a hydrofoil, the less will be the surface effects; hence, the shallower will be the trough.

Another advantage of increased dihedral is clearly shown by a government NACA report issued in 1941, wherein experimental tests providing lift and drag were conducted on V-shaped hydrofoils having dihedrals of 10°, 20°, and 30°, each having a streamlined cross-sectional shape designated as NACA 16–509. These tests were conducted by towing the hydrofoils at different depths and at different speeds and angles of attack. The results clearly showed that the efficiency, often called the lift-to-drag ratio, of the hydrofoils, when their arms pierced the water surface, continually increased with dihedral. The tests also showed that when the V-hydrofoils were fully submerged, their efficiency decreased with dihedral. These tests therefore indicate that the maximum efficiency of surface piercing hydrofoils should occur at a dihedral above 30° and probably below 45°.

Also, other results included in this same report showed that air was sometimes sucked below the surface down the upper side of each surface-piercing hydrofoil arm. When this occurred, the lift dropped abruptly. This phenomenon will herein be called ventilation. When occurring in a random manner on a hydrofoil craft, ventilation can be objectionable and sometimes disastrous, because it will often cause the craft to drop into the water or to turn abruptly if only one arm of the V ventilates. The aforementioned NACA report showed that ventilation occurred more frequently at the higher speed, the higher angles of attack, and at the lower dihedral angles. Ventilation was less at 20° dihedral than at 10°, and even less at 30° than at 20°. Extrapolating, the ventilation tendency should decrease even more at 40° or 50° dihedral. Consequently, increased dihedral beyond 30° was seen to be favorable from the viewpoints of increased efficiency, decreased ventilation, and decreased depth of the surface trough. Theerfore, the arms 14 of the lower portion of the front hydrofoil 3 are preferably designed to have a dihedral of 40°.

It was found that the bow rode excessively far above the top speed water line b—b when all portions of each arm of the bow hydrofoil had a dihedral of 40°. Therefore, to obtain a greater hydrofoil span at take-off and to reduce the height which the hydrofoil rises from the take-off to top speed, the dihedrals of the upper portions 16 of the bow hydrofoil arms are preferably reduced to 34°. Other advantages of this novel design are: First, that in waves the lower central portions 13 of the bow hydrofoil generally remain submerged even in the wave troughs because of their increased depth, thereby providing more constant lift. Second, that in a following sea the bow hydrofoil sometimes tends to dive, and by decreasing the dihedral of the upper portions 16 of the arms, more lift is developed per unit of submerged depth, thereby reducing the depth of the dive. Third, that when the hydrofoil 3 is formed from an extruded bar and placed at a small angle of attack, the angle of attack of the upper portions 16 of the arms of the V will be slightly larger than the angle of attack of the lower portion 14 of the arms; therefore, more lift is developed at take-off which tends to decrease the take-off speed. The tendency to ventilate at higher speeds is also reduced due to the reduced angle of attack of the lower portions 14 relative to the upper portions 16 of hydrofoil 3. Another advantage of the novel bow hydrofoil design is that when turning, the bow hydrofoil must develop a side force which counteracts a portion of the centrifugal force acting on the craft. The increased dihedral of the submerged lower portions 14 of the arms of hydrofoil 3 provide greater depth of submersion and therefore more side-projected area. This permits the required side force to be developed with less yaw angle of attack, otherwise called side-slip, thereby reducing the tendency of the hydrofoil 3 to ventilate during turning.

A method of reducing the tendency of all the hydrofoils to ventilate while turning is to bank the boat inward during the turn. For example, if the boat were turning to port, as in FIGURE 3, it would bank inward if it rolled counter-clockwise when viewed from the rear. This inward bank would tend to increase the effective dihedrals of the right arm of each of the V-hydrofoils, thereby reducing the tendency of the right arms to ventilate. In a port turn, a yaw angle of attack is induced on all three hydrofoils which tends to increase the operating angle of attack of the right arms of each hydrofoil and decrease the operating angle of attack of the left arms. Consequently, the right arms of each hydrofoil will normally tend to ventilate before the left arms. As previously mentioned, however, the inward bank reduced this tendency of the right arms to ventilate thereby significantly improving performance in turns.

Figure 2:
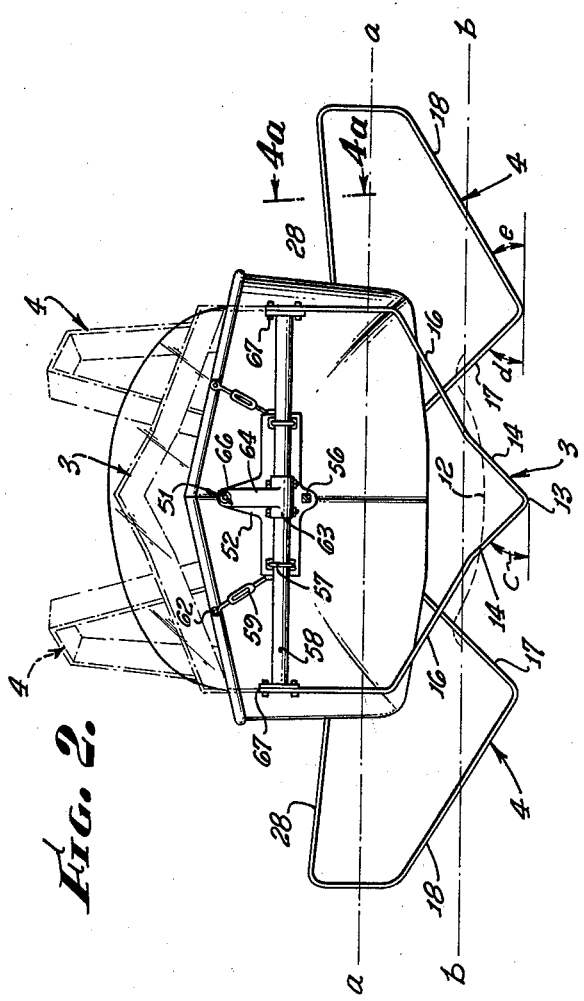
FIGURE 2 is a front view thereof.

The hydrofoil configuration shown in FIGURES 1 and 2 permits the boat to turn, and to bank while turning, without requiring the movement of any of the hydrofoils. This is accomplished by the use of asymmetrical stern hydrofoils 4 and by turning the outboard motor 6, or some equivalent surface, to provide the rudder action for turning. The stern hydrofoils 4 are asymmetric in the sense that the dihedral of their inner arms 17 is greater than the dihedral of their outer arms 18. In FIGURE 2 these angles d and e are preferably 45° and 30° respectively. The reason this novel arrangement provides an inner banking tendency, whereas symmetrical hydrofoils do not, can be shown by analyzing the forces in FIGURE 3.

Figure 3:
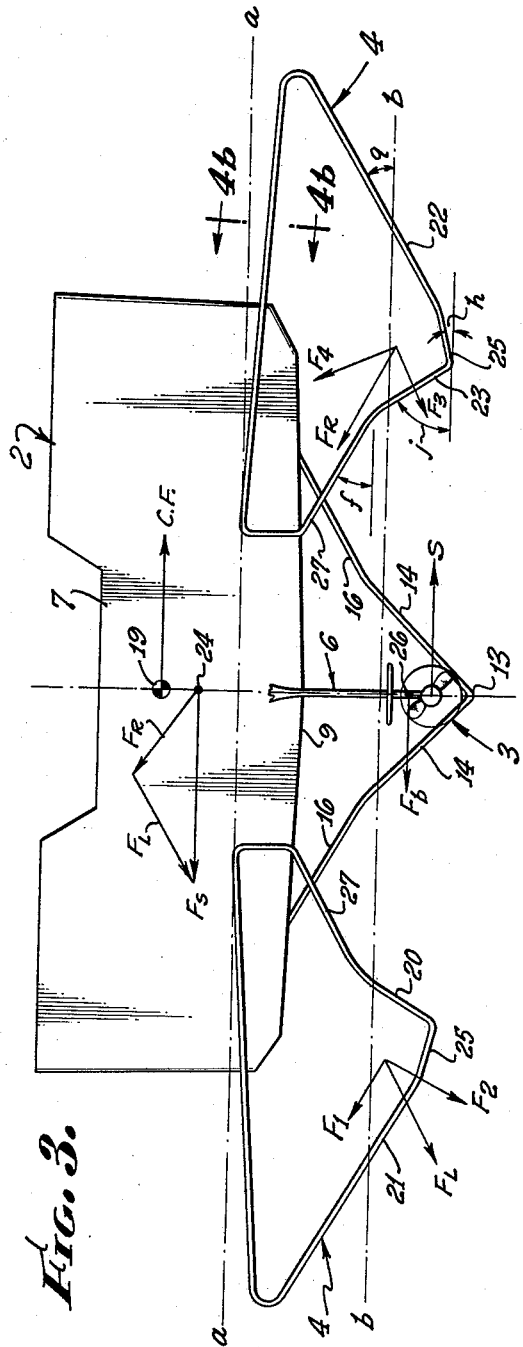
FIGURE 3 is a rear view showing a form of stern hydrofoil somewhat different from that of FIGURE 2 and illustrating the forces acting on the boat, motor, and hydrofoils caused by a steady port turn.

In FIGURE 3 the asymmetry of the stern hydrofoils is somewhat greater than in FIGURE 2 to better illustrate this inward banking principle and to show an alternate design. When turning to port, the centrifugal force, C.F., acts on the center of gravity 19 of the boat in the starboard direction. In order to turn the boat, the outboard motor, or an equivalent rudder, is rotated to produce a side force S at point 19 also directed in the starboard direction. This causes the boat to side-slip, introducing a yaw angle of attack on all the hydrofoils, as mentioned previously. When in a uniform turn, the combination of starboard directed side forces C.F. and S must be counteracted by port directed side forces acting on the three hydrofoils. Therefore, in a port turn the angle of attack of the right arm 20 of the left rear hydrofoil is increased producing a force $F_1$, which is directed perpendicular to the arm 20 and in the port direction. The angle of attack of the left arm 21 of the left rear hydrofoil is decreased producing a force $F_2$ directed perpendicular to the average angle of arm 21 and also in the port direction. Force $F_2$ is slightly larger than force $F_1$, because of its greater span and hence its greater aspect ratio. The forces $F_1$ and $F_2$ can be combined vectorially into a single force $F_L$, which is directed downward and to port as shown in FIGURE 3.

In a similar manner the right arm 22 of the right stern hydrofoil develops a force $F_4$ directed to port and perpendicular to the average angle of arm 22, while the left arm 23 of the right rear hydrofoil develops a force $F_3$ directed to port and perpendicular to arm 23. These forces can be vectorially added to produce a force $F_R$ directed upward and to port. The forces $F_L$ and $F_R$ can now be vectorially added to provide a single side force $F_S$ directed purely to port and centered at point 24. This force $F_S$ is the net force produced by the stern hydrofoils due to a port turn. If the stern hydrofoils had been symmetrical, force $F_S$ would have still been horizontal and directed to port and had the same magnitude, but would have been centered below the water surface $b$—$b$ close to point 26 rather than above the water surface at point 24. The side force $F_b$ acting on the bow hydrofoil at point 26 was obtained in a similar manner by vectorially adding the forces perpendicular to each arm of the bow hydrofoil. In summary, forces $F_S$ and $F_b$ must equal forces C.F. and S when the boat turns to port at a uniform rate.

The boat 2 is shown in FIGURE 3 in an unbanked position for simplicity of illustration. The boat will actualy bank inward in this case because, force S times its moment arm to the center of gravity 19 is greater than force $F_S$ times its moment arm to point 19 plus force $F_b$ times its moment arm to point 19. If force $F_S$ had been concentrated near point 26, as it would have been if the stern foils were symmetrical, the boat would have banked outward because the net moment of forces about point 19 would have been reversed.

At lower speeds, when a greater portion of the hydrofoils are submerged, the asymmetry of the rear hydrofoils need not be so great to provide an inward bank because their reactionary forces $F_S$ tends to be directed closer to the center of gravity. It is sometimes advantageous to alter the dihedral of the inner arm of the stern hydrofoils to reduce the height of the stern above the water at top speed, and this has been shown in FIGURE 3 by a decrease in the dihedral $f$ of the upper portions 27 of the inner arms of the stern hydrofoils to 30°. The lower portions of the inner arms have an appreciably greater dihedral $j$, for example 60°. An alternate design of the inboard arms is shown by the fragmentary view in FIGURE 3$a$ of the left stern hydrofoil where the arm is arcuately curved as at 30, between upper and lower portions 27$a$ and 20$a$, respectively, so the dihedral of the lower portion is increased.

In order to maximize the asymmetry of the stern hydrofoils 3 and to keep the boat from rising excessively high the outboard arms 21 and 22 of the stern hydrofoils have been reduced to a dihedral $g$ of about 30° which represents the minimum dihedral angle at which ventilation is normally prevented at the higher speeds. The dihedrals $h$ of the lower portions 25 of the outboard arms 21 and 22 in FIGURE 3 are 15° and are therefore less than the dihedrals of the upper portions of arms 21 to provide additional asymmetry, thereby further increasing the banking tendency.

It has been found that the asymmetry of hydrofoils 3, shown in FIGURE 2, is adequate to produce an inward bank, and that greater asymmetry provides an even greater inward bank.

It has been found desirable in some cases to splay the stern hydrofoils rearward; that is, to position the outboard tips of the stern hydrofoils 4 further rearward than the inboard tips. The reason for this is that, if when turning to port, for example, the turn rate of the boat is continually increased, the right arms of the hydrofoils will eventually ventilate, and by splaying the stern hydrofoils slightly rearward the angle of attack of the inner arms will be increased relative to the outer arms, thereby causing the right arm of the left stern hydrofoil to ventilate first and lose lift. Referring to FIGURE 3, it can be seen that if arm 20 loses lift the stern of the boat will tend to drop and the boat will bank sharply inward thereby providing a maximum of comfort and safety to the passengers by positively preventing the boat from overturning no matter how sharp the turn.

Other methods of increasing the inward banking tendency of the boat are to decrease the chord length of the inner arms 27 of the stern hydrofoils, or to extend the outer arms 21 and 22 inward past their intersection with arms 20 and 23 respectively.

Another novel aspect that can be applied to hydrofoil craft in general is to automatically reduce the trim of the craft as the speed increases by making the average dihedral of the bow hydrofoil 3 less than the average dihedral of the stern hydrofoils 4. Because of the lower dihedral, the bow hydrofoil will raise the bow of the boat less with increasing speed than the stern hydrofoils raise the stern. This produces a reduction in trim of the boat reducing the angles of attack of the hydrofoils thereby reducing their susceptibility to ventilation and cavitation at higher speeds.

Figure 4A:
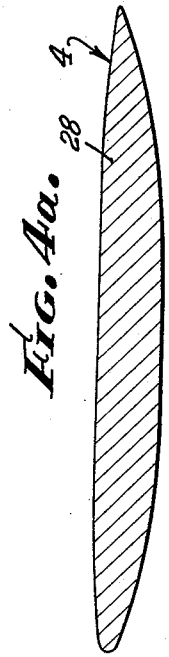
FIGURE 4a is a sectional view taken along line 4a—4a of FIG. 2.
Figure 4B:
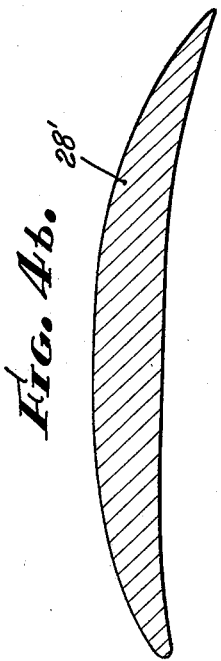
FIGURE 4b is a sectional view taken along line 4b—4b of FIG. 3.
Figure 3A:
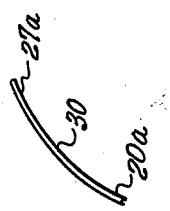
FIGURE 3a is a fragmentary rear view of an alternate design of the inboard arm of the left stern hydrofoil.

The stern hydrofoils 4 are preferably formed from extruded bars having a streamlined cross-section similar to cross-sections currently being used for high speed subsonic airfoils. After experimenting with various cross-sections, the best was found to be the NACA 16–510 section, which is similar to, but slightly thicker than, the NACA 16–509 section used by the NACA in their towing tank test mentioned previously. To provide maximum strength and simplicity, the ends of the bar forming each stern hydrofoil 4 are fastened together so each hydrofoil is a strong continuous member. When bent in this manner, the upper substantially horizontal portions 28 are inverted as shown in FIGURE 4$a$ and would therefore produce negative lift, if submerged. Consequently, the upper portions 28 of the stern hydrofoils lie well above the water surface $a$—$a$ as shown in FIGURE 2. Arms 28 in FIGURE 2 are shown to slant slightly upward at their outer portions to further prevent their getting submerged when the boat banks in turns at lower speeds. These arms 28 have been found by water skiers to be convenient for sitting on while putting on their water skis. Also, the arms 28 of the stern hydrofoils 4 have been found to be highly convenient when boarding the boat from the water since they and the lower portions 17 and 18 can be used like a ladder.

An alternate design of the upper portions 28 of the stern hydrofoils is show in FIGURE 3, wherein portions 28′ are initially submerged below water level $a$—$a$. In this modification, additional lifting area at take-off can be provided if the hydrofoil cross-section along arm 28 is changed by reforming that portion in a hydraulic press or the like, such that the cross section is changed to the shape shown in FIGURE 4$b$.

Another novel aspect of this invention is the mechanism shown in FIGURE 5 for supporting and retracting the stern hydrofoils. Hydrofoil 4 is bolted to a U-shaped member 29 which pivots about pivot shaft 31. Shaft 31 is pivotally attached to bracket 33 at pivot point 32 so it can rotate in a vertical plane transverse to boat transom 7 to which bracket 33 is rigidly attached. During operation, hydrofoil 4 bears against abutment 34, which prevents it from moving upward. A portion of the abutment 34 consists of bolt 36 or the like which extends through a hole 35 in hydrofoil 4 to restrain hydrofoil 4 from moving sideward or backward. A turnbuckle 37 is attached to abutment 34 at point 38. Hook 39 of turnbuckle 37 is clipped over slot 40 cut into the trailing edge of hydrofoil 4 and turnbuckle 37 is tightened to firmly hold hydrofoil 4 against abutment 34.

Shaft 31 is restrained from pivoting about point 32 by means of an adjustable arm such as turnbuckle 41 which is pivotally attached between bracket 33 at bolt 42 and bar 43 at bolt 44. Bar 43 is screwed onto the end of pivot shaft 31 to hold member 29 in position and to serve as an attachment point for turnbuckle 41. By this construction, hydrofoil 4 is restricted from pivoting about an axis *c—c* by turnbuckle 41. By adjusting turnbuckle 41 the angle of attack of hydrofoil 4 may be varied.

When beaching, mooring, or operating the hydrofoil craft in shallow water, the stern hydrofoils 4 can be retracted by loosening turnbuckle 37 to free hook 39 from slit 40. Hydrofoil 4 is slightly lowered (pivoting about shaft 31) to free it from bolt 36, pivoted rearward a short distance (about a substantially vertical axis through bolts 32 and 42) to clear abutment 34, then rotated upward and rearward about pivot shaft 31. In clearing the abutment 34, pivoting is effected through a loose fit on the bolts 32 and 42. Since shaft 31 is inclined at an angle downward and rearward with respect to the transom 7, the hydrofoil 4 will retract into a position wherein its inner arm 17 is above the bottom 9 of the transom 7 and its outer arm 18 is substantially inside the maximum beam width of the boat, thereby being in a retracted position that will keep it from being damaged when mooring, beaching, docking, or transporting. This retracted position is shown by dotted lines in FIGURES 1 and 2.

In case the rear hydrofoil 4 strikes an obstruction while traveling forward, a moment will be produced tending to twist hydrofoil 4 about axis *c—c*. This twisting moment, if sufficiently large, will cause bolt 47 to shear, thereby permitting hydrofoil 4 to pivot around an axis joining bolt 48 and slot 40. This pivoting will decrease the angle of attack of hydrofoil 4 thereby producing a downward, or negative, lift which will pull hydrofoil 4 downward so bolt 48 slips through slot 49 in member 29, and arm 28 slips downward past bolt 36 thereby releasing hydrofoil 4 from the boat.

Figure 6:
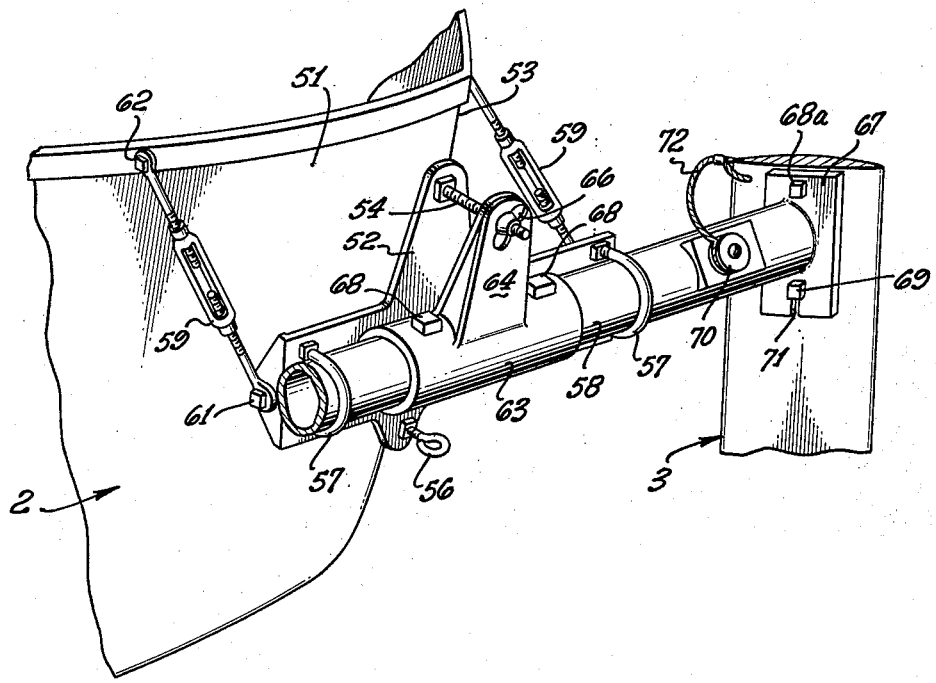
FIGURE 6 is a fragmentary perspective view of the front hydrofoil mounting attached to the bow stem of the boat showing a portion of the bow hydrofoil.

The method for attaching the bow hydrofoil 3 to the bow 51 of boat 2 is shown in FIGURE 6. Bracket 52 is attached to the bow stem 53 by nuts on threaded rod 54 and by nuts on eye bolt 56. Bearings, such as U-bolts 57, are attached to bracket 52 to pivotally mount shaft 58 to bracket 52. Links 59 are secured between each side of bracket 52 at points 61 and the gunwale of boat 2 at point 62. The link 59 in FIGURE 6 is shown as an adjustable turnbuckle to permit precise alignment of the shaft 58. This method of attachment of the bow hydrofoil bracket 52 to the bow 51 is simple and provides a strong attachment, since the gunwale and bow stem are generally reinforced on most boats. Furthermore, this method of attachment is widely adapted to a great variety of boats.

An adjusting sleeve 63 is placed circumjacent and freely pivotable with shaft 58. Projecting arm 64 of sleeve 63 extends forward and upward from shaft 58 permitting rod 54 to pass through a hole in the upper part of arm 64. A wing nut 66, or equivalent means for adjusting the position of arm 64, is attached to rod 54. By screwing nut 66 back and forth along rod 54 the angular setting of adjusting sleeve 63 can be varied.

Key bolts 68 are placed through matching holes in adjusting sleeve 63 and shaft 58 to key sleeve 63 to shaft 58 during operation of the hydrofoil craft. A plate 67 is fastened to each end of shaft 58 to which the upper part of bow hydrofoil is bolted. Consequently, the angle of attack of bow hydrofoil 3 is varied, with adjusting sleeve 63 whenever the wing nut 66 is moved.

In order to retract the bow hydrofoil 3 key bolts 68 are removed and hydrofoil 3 and shaft 58 are pivoted forward and upward in bearings 57 to the retracted position shown by dotted lines in FIGURES 1 and 2. This configuration permits the angle of attack setting of hydrofoil 3 to remain unchanged by the retraction process. Another aspect of this design permits the eye of eye bolt 56 to be used as a boat hook for pulling the boat onto a trailer for transporting it over land.

The bow hydrofoil 3 is attached to plate 67 by a shear bolt 68a which shears when the bow hydrofoil strikes an obstruction with sufficient force. Hydrofoil 3 then pivots about bolt 69 in the hydrofoil until the angle of attack is reduced to where negative lift is developed. Hydrofoil 3 is then pulled downward out of slot 71 and freed from plate 67 and from the boat. Since hydrofoils made of a metal such as aluminum will sink in water, it is convenient to retain them to the boat after they shear free in order to recover them in deep water. In early experiments the hydrofoils were retained to the boat by means of relatively short cables so they would drag along behind the bolt after shearing free. A more recent and less expensive method for attaching the hydrofoils to the boat was found to be a relatively long line made of less expensive material such as nylon cord attached between the hydrofoil and the hydrofoil support structure. A bow line 72 is shown in FIGURE 6 fastened between hydrofoil 3 and shaft 58 so it will freely pay out after hydrofoil 3 has separated from plate 67. The line 72 should be sufficiently long so the boat, after hitting an obstruction, would normally stop before the line was completely payed out. The line 72 is coiled at 70 and temporarily affixed to shaft 58 in any suitable manner. In this manner, the line is required to have a tensile strength of only two to three times the weight of the hydrofoil it must support. If line 72 were shorter, it would have to withstand the relatively high drag forces which would act on the hydrofoil as it was trailed behind the boat.

I claim as my invention:

1. A hydrofoil craft comprising; a boat; means defining a symmetrical lifting surface fixed to said boat at the bow thereof; a pair of hydrofoils secured to said boat near the stern thereof, one on each side of the boat's center line, each of said hydrofoils comprising a pair of arms arranged in downwardly converging shape in a vertical plane, each vertical plane extending outwardly and slightly rearwardly of said boat whereby the inboard arm of each V-shape presents a higher angle of attack than the outboard arm thereof.

2. A hydrofoil craft comprising; a boat; means defining a symmetrical lifting surface fixed to said boat at the bow thereof; a pair of hydrofoils secured to said boat near the stern thereof, one on each side of the boat's center line, said lifting surface at the bow of said boat comprising a downwardly pointed V-shaped hydrofoil, the dihedral of the upper portion being substantially less than the dihedral of the lower portion thereof; each hydrofoil of said pair being of asymmetrical V-shape, the dihedral of the outboard arm of each being substantially less than the dihedral of the inboard arm.

3. A hydrofoil craft comprising; a boat; means defining a symmetrical lifting surface fixed to said boat at the bow thereof; a pair of hydrofoils secured to said boat near the stern thereof, one on each side of the boat's center line, each hydrofoil of said pair being pivotally mounted on said boat by mounting means defining a pivot axis extending in a downward and rearward direction; and adjustment means for adjusting said mounting means about a transverse axis to change the angle of inclination of said pivot axis.

4. A hydrofoil craft as defined in claim 3 including means releasably holding each hydrofoil of said pair against movement about its pivot axis and in a substantially vertical plane extending transversely of said boat and with portions of each hydrofoil extending outwardly of the sides of the boat and below the bottom thereof.

5. Hydrofoil craft in accordance with claim 3, wherein said symmetrical lifting surface fixed to said boat at the bow thereof comprises a V-shaped bow hydrofoil, bracket means for securing the central portion of the said bow hydrofoil to the bow stem of said boat, and bracing rods of adjustable length secured to said boat on opposite sides of said bow stem and extending forwardly to brace said bow hydrofoil.

6. A hydrofoil craft comprising: a boat; means defining a symmetrical lifting surface fixed to said boat at the bow thereof; a pair of hydrofoils secured to said boat near the stern thereof, one on each side of the boat's center line; each hydrofoil of said pair being pivotally mounted on said boat by mounting means defining a pivot axis extending in a downward and rearward direction; adjustment means for adjusting said mounting means about a transverse axis to change the angle of inclination of said pivot axis; said lifting surface at the bow of said boat comprising a V-shaped bow hydrofoil having a generally horizontal upper member extending transversely of said boat; bracket means for securing the central portion of said upper member to the bow stem of said boat for angular adjustment about a transverse horizontal axis; and bracing rods of adjustable length secured to said boat on opposite sides of said bow stem and extending forwardly to brace said bow hydrofoil.

References Cited in the file of this patent

UNITED STATES PATENTS

| | | |
|---|---|---|
| 1,187,268 | Crocco | June 13, 1916 |
| 1,852,680 | Shaw | Apr. 5, 1932 |
| 2,081,868 | Hampden | May 25, 1937 |
| 2,603,179 | Gardiner | July 15, 1952 |
| 2,713,317 | Herz | July 19, 1955 |
| 2,720,180 | Schertel | Oct. 11, 1955 |
| 2,749,869 | Bush | June 12, 1956 |
| 2,795,202 | Hook | June 11, 1957 |
| 2,842,083 | Vertens | July 8, 1958 |
| 2,856,877 | Baker | Oct. 21, 1958 |
| 2,856,878 | Baker | Oct. 21, 1958 |
| 2,856,879 | Baker | Oct. 21, 1958 |
| 2,890,672 | Boericke | June 16, 1959 |
| 2,906,229 | Boericke | Sept. 29, 1959 |

FOREIGN PATENTS

| | | |
|---|---|---|
| 315,235 | Switzerland | Sept. 15, 1956 |
| 493,176 | Great Britain | Oct. 4, 1938 |
| 517,633 | Great Britain | Feb. 5, 1940 |
| 867,965 | France | Sept. 8, 1941 |
| 557,662 | Italy | Feb. 19, 1957 |
| 1,179,702 | France | Dec. 22, 1958 |
| 814,173 | Great Britain | June 3, 1959 |
| 572,413 | Great Britain | Oct. 8, 1945 |

OTHER REFERENCES

"Yachting," vol. 103, No. 3, Mar. 1958. (Pages 63–66 relied on.)

"The Rudder," vol. 74, No. 8, Aug. 1958. (Pages 6–8 and 58 relied on.)